July 1, 1958 — A. S. GORSHKOFF — 2,841,023
REVERSE GEAR

Filed Feb. 3, 1953 — 5 Sheets-Sheet 1

INVENTOR
A. S. Gorshkoff
BY Rockwell & Bartholow
ATTORNEYS

July 1, 1958

A. S. GORSHKOFF 2,841,023

REVERSE GEAR

Filed Feb. 3, 1953

INVENTOR
A. S. Gorshkoff
BY
ATTORNEYS

July 1, 1958 A. S. GORSHKOFF 2,841,023
REVERSE GEAR
Filed Feb. 3, 1953 5 Sheets-Sheet 3
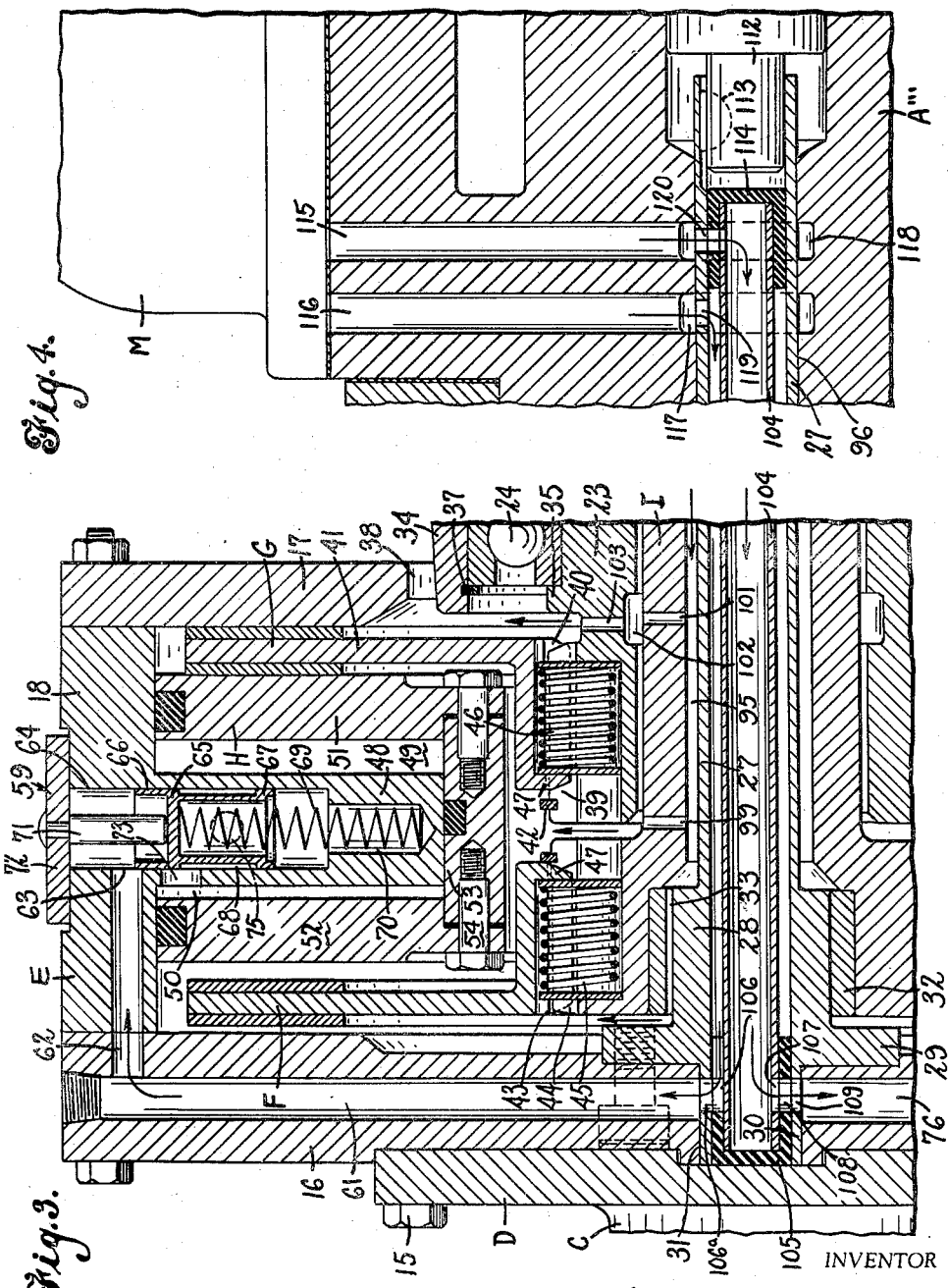
INVENTOR
A. S. Gorshkoff
BY
ATTORNEYS July 1, 1958 A. S. GORSHKOFF 2,841,023
REVERSE GEAR
Filed Feb. 3, 1953 5 Sheets-Sheet 4

INVENTOR
A. S. Gorshkoff
BY Rockwell & Bartholow
ATTORNEYS

July 1, 1958 A. S. GORSHKOFF 2,841,023
REVERSE GEAR
Filed Feb. 3, 1953 5 Sheets-Sheet 5
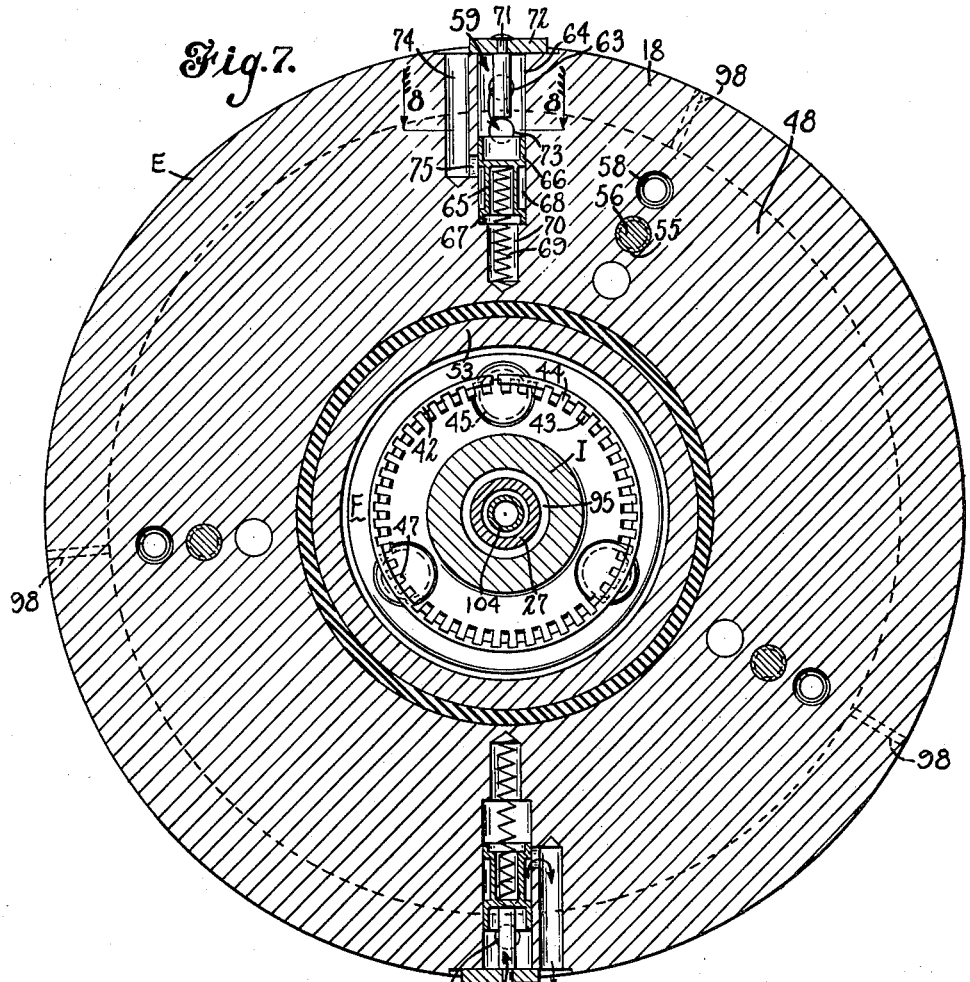
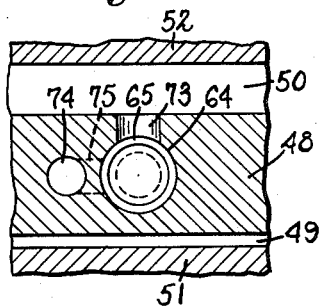
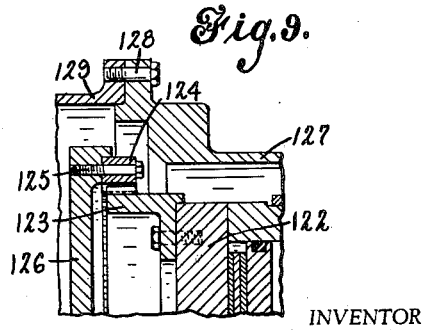
INVENTOR
A. S. Gorshkoff
BY Rockwell & Barkshaw
ATTORNEYS

United States Patent Office 2,841,023
Patented July 1, 1958

2,841,023

REVERSE GEAR

Alexis S. Gorshkoff, Oxford, Conn., assignor to The Snow-Nabstedt Gear Corporation, Hamden, Conn., a corporation of Connecticut Application February 3, 1953, Serial No. 334,947

9 Claims. (Cl. 74—377)

This invention relates to reverse gears, and while it is applicable to other uses it has particular reference to those used in boats and other marine equipment where a prime mover drives a propeller shaft or other output shaft.

One of the objects is to provide an improvement in the general organization of the reverse gear parts with a view to providing a reverse gear which has simplicity and compactness and performs in an effective manner.

Another object is to provide an improved gear embodying friction clutches operable hydraulically by a liquid such as oil.

A further object is to provide a reverse gear having an improved arrangement of driving member, hydraulically operable friction clutches for forward and reverse, respectively, and gear members for effecting reverse motion of the shaft.

A further purpose is to provide an improved supply and distribution means for the pressure fluid and improvements in the provisions for the lubrication of the mechanism.

An additional object is to furnish a reverse gear having improved friction-clutch means, and also to provide an improved friction-clutch mechanism.

In the accompanying drawings:

Fig. 3 is a sectional view on a larger scale, illustrating certain parts shown in Fig. 1, but the mechanism in this instance being in position for reverse drive;

Fig. 4 is an enlarged sectional view showing certain parts which are in the right-hand portion of Fig. 1;

Fig. 7 is an enlarged section on line 7—7 of Fig. 1;

Fig. 8 is a section on line 8—8 of Fig. 7; and

Fig. 9 is a fragmentary longitudinal section showing a reverse gear in which the driving member is of modified form.

Figure 1:
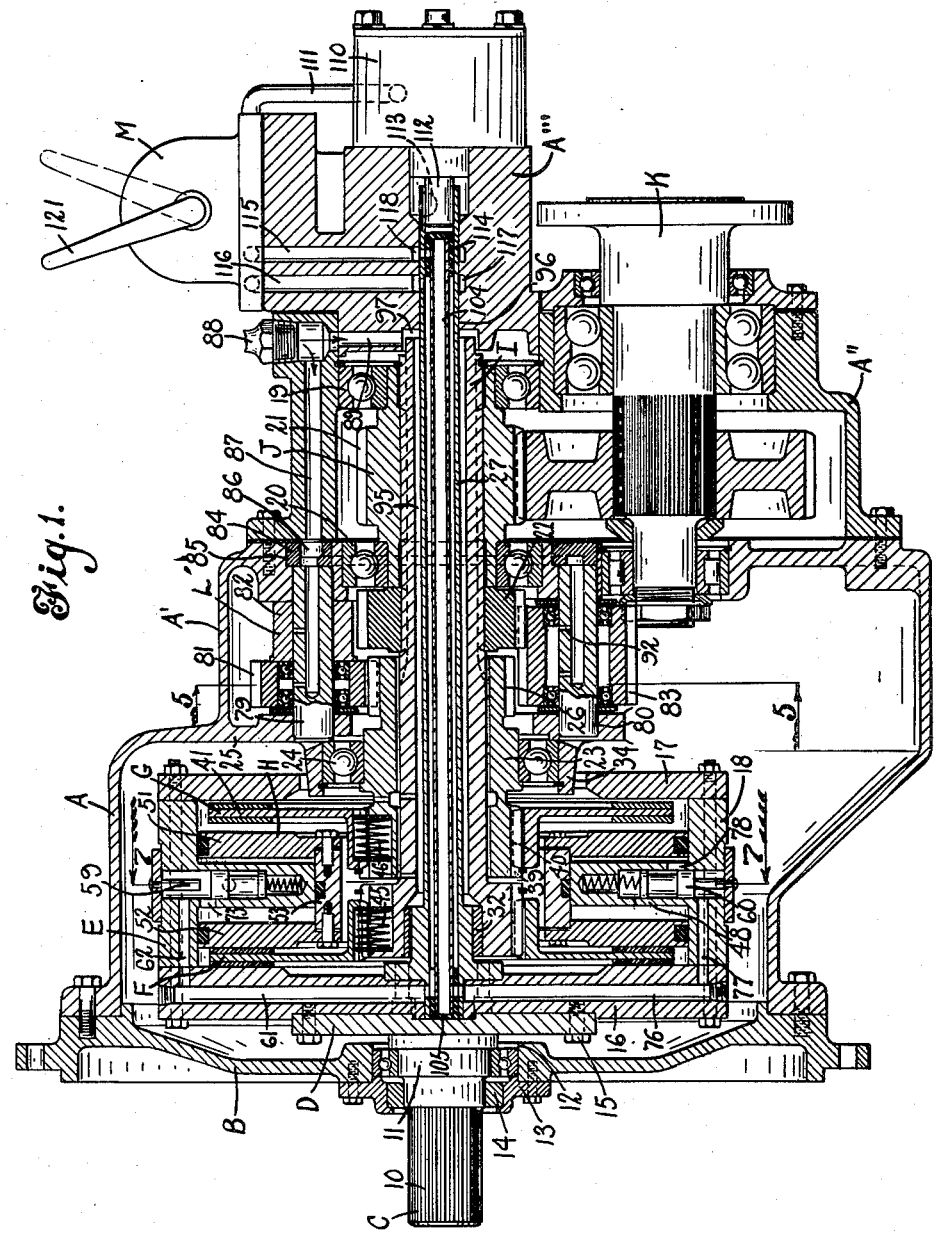
Fig. 1 is a longitudinal central section of a reverse gear embodying the invention, the same being taken on a vertical plane except for a slight offsetting of the section in parts of the gear set, the mechanism in this view being in position for forward drive.

The reverse gear shown in Figs. 1 to 8, inclusive, of the drawings by way of example is one in which the main housing is closed at the forward end, and contains within the forward end, in close adjacency to the forward wall, a driving part in the nature of a disk which is applied to the rear end of a short shaft in the nature of a stub journaled in the forward wall of the housing and projecting forwardly from the housing for coupling with the rear end of an engine-driven shaft, not shown. Within the housing is a driving member in the nature of a shell or drum to which the above-mentioned disk is rigidly attached in a suitable manner. This shell or drum is concentrically arranged with respect to a driven shaft having its forward end located within the shell, the rear end portion of said shaft being connected by reduction gearing to an offset parallel shaft the rear end of which is adapted to be coupled to a propeller shaft or the like. Rearwardly of the driving shell and located within the housing is a set of reverse gears cooperating with a gear in an intermediate location on the driven shaft for the purpose of driving this shaft in the reverse direction. The driving shell houses within it two friction clutches, one having a forward location and the other a rear location, both being engageable by fluid-pressure means, the clutch in the forward location being adapted to clutch the shell to the driven shaft for producing forward drive, and the rearwardly located clutch being operable to clutch in a sleeve mounted around the driven shaft, said sleeve being equipped with a gear which will rotate the driven shaft, through the reversing gears, in the reverse direction. The pressure fluid for actuating the friction clutches is, in this embodiment, delivered to the mechanism in a location adjacent the rear end of the driven shaft and is forced forwardly through passageways within the driven shaft so as to reach the forward end of the driven shaft, and to be distributed to the cylinder and piston assembly actuating the clutches and housed within the driving shell.

In the drawings, the main housing is indicated at A, the forward wall of the housing at B, the stub shaft journaled in this wall at C, the driving disk at D, the driving shell or drum at E, the movable friction clutch members at F and G (the member F being that which produces forward drive), the fluid-pressure or hydraulic mechanism for actuating the clutches at H, the driven shaft at I, the reduction gearing at J, the offset output shaft at K, and the reverse gear set or assembly at L. At M is indicated a selector valve which in this instance is located on the rear portion of the housing, this valve having a neutral position in which the supply of pressure fluid is cut off and having an operative position in which pressure fluid is supplied to the forward drive clutch, and another position in which fluid is supplied to the reverse drive clutch.

The stub shaft C has an exterior portion which may be splined, as indicated at 10, for connection of a suitable driving member in the form of a shaft or the like, and the shaft C may, as shown, have a cylindrical bearing portion 11 by means of which it is supported by an antifriction bearing in an opening 12 of wall B. A metal cap ring 13 applied to the wall by fastening screws holds in place a packing 14 which prevents the escape of lubricant from the housing. In the interior of the housing the disk D may be suitably fixed to the stub shaft or it may be integral therewith, and this disk is applied to the flat forward wall of the shell E by means such as screws 15.

The shell or drum E has at the forward end the wall 16 and at the rear wall 17, and these walls are suitably connected as by bolts to a cylindrical peripheral wall 18. For clutching purposes the movable clutch member or plate F is clamped against the wall 16 and the clutch element or plate G against the forward face of the wall 17. The forward end of the drum is rotatably mounted in the housing by virtue of its connection with the disk D. The forward end of the driven shaft I extends within the shell, this being a hollow shaft, and the forward end is supported by provisions hereinafter described. The rear end of this shaft is journaled in the housing by means of antifriction bearings 19 and 20, located respectively rearwardly and forwardly of a gear 21 forming a part of the reduction gearing J and keyed to the shaft I.

By rotatably supporting this gear, as shown in Fig. 1, at two points in the housing, the rear portion of the shaft is effectively supported for rotation. The forward antifriction bearing 20 just mentioned is supported in the rear portion of a housing portion A', which is of less height than the housing portion forwardly thereof, as shown in Fig. 1, and the reversing gearing L hereinbefore mentioned is mounted within the housing portion A'. This gearing includes a gear 22 keyed to the shaft forwardly of the antifriction bearing 20. It has been mentioned before that the movable friction-clutch element G is adapted to be operatively connected to a sleeve member which actuates the reverse gearing. This sleeve member is indicated at 23, this sleeve portion being journaled in the housing by an antifriction bearing 24 located immediately forwardly of a partition 25, which extends transversely of the housing in a location where the housing portion A' joins the portion of greater height. The sleeve member 23, as appears from Fig. 1, surrounds the driven shaft I with clearance, and at its rear end it has as a part thereof a gear 26 serving as an actuating gear for the reverse gearing. On the other hand, the forward end of the sleeve element 23 is extended into the shell E where it is adapted to cooperate with the movable clutch member G in the manner hereinafter described.

The forward end of the driven shaft I is supported from the forward wall of the driving shell, and for this purpose an inner supporting member 27, disposed within the shaft and fixed to the driving shell, is utilized. This member 27 is in the form of a tube spaced from the inner surface of the shaft and provided with a thickened forward end 28 (Fig. 2) carrying a lateral flange 29 and a forward extension 30, said extension being received in an aperture 31 provided at the center of the wall 16 and closed by the disk D. The flange 29 is received in a recess in the rear face of the wall 16, and securing means such as bolts fasten the forward end of tubular member 27 to the wall 16 so that the tubular member is rotated by the driving member. The thickened part 28 of the tubular member serves to support the forward end of the shaft I, and for this purpose a ring 32 of bearing metal is interposed between the outer surface of part 28 and the inner surface of the shaft. For lubrication purposes the bearing ring 32 is provided with a number of longitudinal grooves 33 so that lubricating oil can pass through the bearing, as hereinafter more particularly described.

Figure 2:
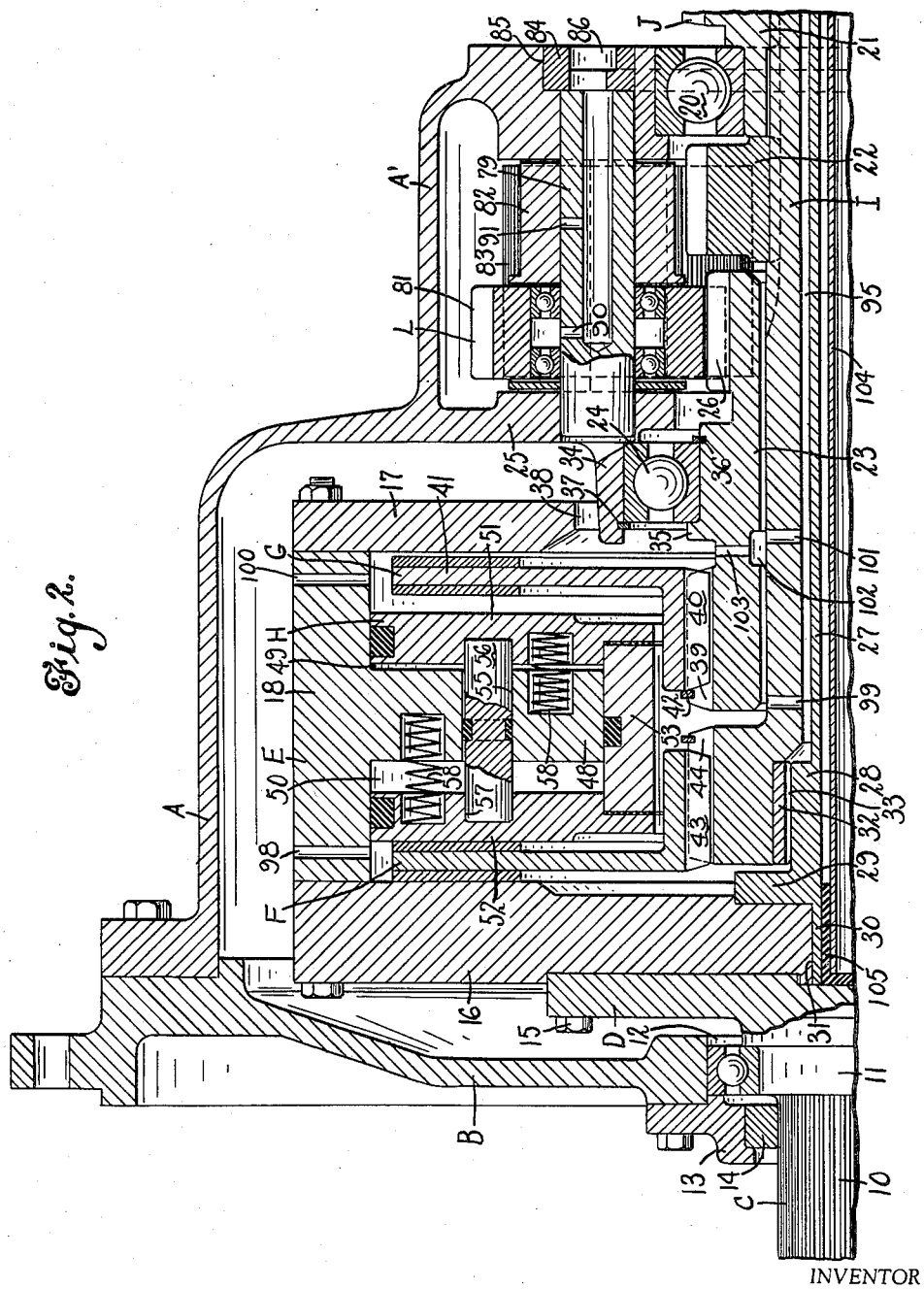
Fig. 2 is an enlarged section of certain parts shown in Fig. 1, taken on line 2—2 of Fig. 5, the parts being in position for forward drive.

Reverting to the antifriction bearing 24 supporting the sleeve 23, it will be noted from Fig. 2 that this bearing is supported radially outwardly by a ring-like extension 34 projecting forwardly from the wall or partition 25, and it will be observed that this bearing is held in place relatively to the sleeve member by a radial flange 35 on the sleeve member, and by a snap ring 36 associated with the sleeve member, as shown in Fig. 2, and that a snap ring 37 holds the bearing 24 in position in the member 34. The rear wall 17 of the driving shell has a central aperture 38 in which the bearing structure just described is received.

At its forward end the sleeve member 23 is provided with longitudinal splines, as indicated at 39, and cooperating with these splines are splines 40 carried by an axially extending inner part of the movable clutch member G. This clutch member or plate is formed in part by a web 41, and integral with the web is a forwardly extending annular flange surrounding the sleeve member 23, and the splines 40 are provided at the inner face of this flange. In its radially outer part the web 41 is provided at its opposite faces with friction material, as best shown in Fig. 2, and the friction material at the rear face is intended to be pressed against a friction surface on the wall 17, whereas the friction material at the forward face of the clutch member is intended to be contacted by a rearwardly moving piston member, as hereinafter described, for the purpose of engaging the movable clutch member with the driving member. Movement of the clutch member away from the rear wall of the driving member is limited by suitable means such as a snap ring 42 carried at the forward end of the sleeve 23.

The movable clutch member F is similar in structure to the member G, but its annular flange provided with splines 43 is directed rearwardly rather than forwardly. This clutch plate is intended to be pressed forwardly by a piston, as hereinafter described, so that the friction material at its forward face makes contact with the rear face of the wall 16. The splines 43 of this member engage longitudinal splines 44 provided upon the radially outer face of the widened mouth portion of the hollow driven shaft I.

As shown more particularly in Fig. 3, the axially movable clutch members F and G are normally held out of contact with the cooperating surfaces of the driving shell by springs 45 and 46, respectively, of helical shape that act against shoulders 47 formed integrally with the annular flanges of the clutch members. As shown in Fig. 3, the spring 45 is received in a socket between the mouth portion of shaft I and the clutch member F, whereas the spring 46 is received in a socket between the clutch member G and the forward end portion of the sleeve 23, and the action of each spring is to urge the clutch member axially so as to hold it normally against the stop ring 42 which limits its axial movement.

Referring to the axial annular wall 18 of the driving shell, it will be noted that this wall has an integral extension in the nature of a web extending inwardly in a radial direction midway of the axial dimension of the wall so as to form a partition in the driving shell radially outwardly of the flanges of the clutch members. This wall or partition is indicated at 48, and it serves, among other things, as a part of a duplex fluid-pressure cylinder and piston arrangement whereby the clutch members F and G can be engaged alternately with the driving shell. As shown in Fig. 3, a cylinder space 49 is at the right of this wall and a similar space 50 at the left, and within these spaces are annular pistons 51 and 52, respectively, each piston engaging the inner surface of wall 18 at the radially outer part of the piston, with suitable packing interposed between the piston and the axial wall of the cylinder. At the radially inner parts of the pistons 51 and 52 the latter are rigidly interconnected by a connecting member which in this form is an annular ring 53 having radially inner and outer surfaces which are cylindrical, the radially outer surface being slidable along the inner edge portion of the wall 48, with suitable packing interposed to prevent the escape of the pressure fluid from the cylinders. In the form shown, the connecting member 53 is engaged in rabbets of the pistons and bolted to the pistons by bolts 54, the arrangement being such that the pistons and the connecting member provide what is practically an integral structure which moves axially in one direction when fluid is introduced into one cylinder and in the opposite direction when it is introduced into the other cylinder. This piston structure, it will be understood, is of U-shaped cross section presenting a channel open at the radially outer part and supported for movement by the wall 18 and by the partition wall 48 extending therefrom.

In addition to the guidance given to the piston structure by the inner cylinder walls and the inner part of the partition, it is advisable to provide members supported in the partition at intermediate points radially, by which the piston parts 51, 52 are guided and coordinated in their movements. A device of this kind is shown in Fig. 2, where the partition or wall is provided with a bore 55 extending in an axial direction, and this bore has slidable therein a rodlike member 56 that has cylindrical end portions engaging sockets 57 in the respective pistons. The rod carries in an intermediate groove a suitable packing so that the pressure fluid cannot pass from one cylinder into the other, and, as the rod member is closely fitted in the bore 55 and has secure fastening to the pistons, the pistons move together axially and cannot have any turning movement relatively to each other. It will also be noted that, as shown in Fig. 2, springs are preferably provided for urging the pistons in a direction such that the respective piston will be pressed toward its engaged position. Here helical springs 58 have their ends engaged in sockets in the piston and the partition member, respectively. The function of springs 58, which act in conjunction, is to centralize the pistons with respect to the partition wall 48 when the mechanism is in the neutral position and to effect quick release of the pistons from the clutch plates when the exhaust ports are opened.

In this form the device is provided with a valve controlling the entrance and exhaust of fluid in respect to each piston, and these two valves are located in the member 18 and its extension wall or partition 48. The valve device for the forward drive clutch member cylinder is indicated at 59, and the valve device for the reverse drive clutch member cylinder is indicated at 60, and these two valves are preferably located diametrically, as shown in Fig. 7. The fluid which is to be controlled by valve 59 moves through a central conduit or passageway within the driven shaft and is delivered to a radial passage 61 in the forward wall of the driving shell, in which passage it moves in a radially outward direction, and at the peripheral part of the shell the fluid enters an axial bore 62 in which it passes rearwardly toward the valve, as shown in Fig. 3. At the end of this bore 62 is a mouth or port 63 communicating with a cylindrical radial bore 64 that extends through the wall 18 and into the partition wall 48, and contains a sliding sleeve valve 65. This sleeve valve is of cylindrical form with a cuplike radially outer portion 66 closely fitting the bore 64, and with an inner end 67 also fitting the bore and with a groove 68 extending around the body of the valve. The inner end of the valve is open and the valve is urged toward the position of Fig. 3 by a helical spring 69 which is partly socketed in the valve body and partly in a socket 70 formed in the partition wall 48. This spring 69 normally holds the sleeve valve against a limiting pin 71 that is attached to a plate 72, and this plate 72 extends over and closes the outer end of the bore 64. With reference to Fig. 3, it will be noted that somewhat below the port 63 a port 73 is adapted to establish communication between the bore 64 and the cylinder 50. It will be observed from Fig. 7 that alongside the bore 64 is a parallel smaller bore 74, the outer end of which is open at the surface of the shell or casing. This bore is an exhaust bore which is in communication with the bore 64 by way of a port 75.

Corresponding to the conduit or passage 61, which is appurtenant to valve 59, is a diametrical conduit or passage 76 at the opposite side of the driving shell axis through which fluid passes to the valve 60. The conduit 76 communicates with a bore 77 similar to the bore 62, but it is to be observed from the lower part of Fig. 1 that the inlet port 78 of valve 60 (which corresponds to inlet port 73) is at the rear side of the valve in order to establish communication with the rear cylinder 49. Otherwise, however, the valve and valve arrangement appurtenant to the rear cylinder are identical with those appurtenant to the forward cylinder, and both valves are shown in Fig. 7.

Figure 5:
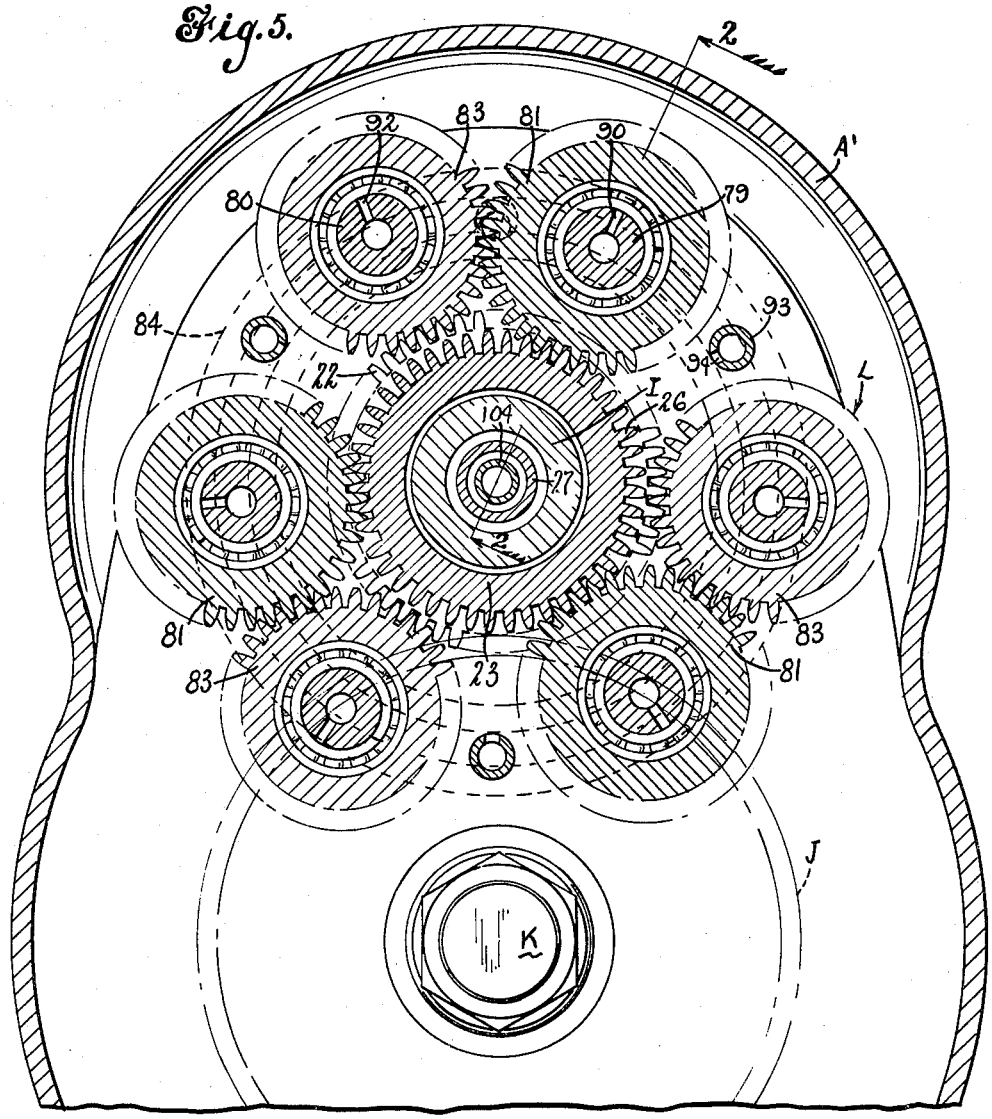
Fig. 5 is an enlarged section on line 5—5 of Fig. 1.
Figure 6:
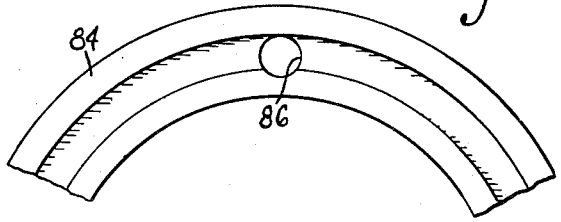
Fig. 6 is a detail of a distributing ring for lubricating oil.
Figure 6A:
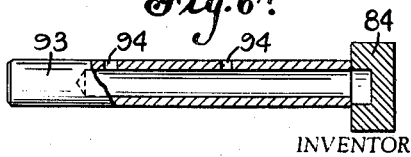
Fig. 6A is a detail, partly in elevation and partly in section, showing one of the spray pipes illustrated in Fig. 5.

With reference to the reverse gear set or assembly L, it has been previously indicated that reverse rotation of the shaft I is secured by rotation of the sleeve gear 26, and this gear meshes with pinions mounted in the housing portion A', which pinions effect drive in the reverse direction of the gear 22 mounted on shaft I. The pinions referred to are pinions which rotate about longitudinally arranged fixed shafts in the housing, and in the present case there are six shafts in all arranged around the shaft I, these shafts being arranged in groups, there being in each group a short pinion meshing with the sleeve gear 26 and a long pinion meshing with the latter pinion and also meshing with the gear 22. This arrangement is shown in Fig. 5 as well as Fig. 1, and it will be seen that each group comprises a fixed hollow shaft 79 and a similar hollow shaft 80 having their ends held in partitions of the main housing. The shaft 79 rotatably supports a short pinion 81 which is in the plane of and meshes with the sleeve gear 26. The space around the shaft 79 which is not occupied by the pinion 81 is taken up by a spacer 82, which at one end lies against the pinion bearing and at the opposite end abuts one of the partitions. The short pinion 81 meshes with a long pinion 83 rotatably mounted about the shaft 80, and the long pinion 83 meshes in turn with the gear 22.

The shafts of all of the pinions are hollow throughout the greater part of their length and are adapted to receive lubricating oil entering the shaft from the rear end. The lubricating oil enters the bore of the shaft from a distributing ring 84 mounted in a groove 85 in the adjacent housing partition, said distributing ring being of channel shape so as to provide a forwardly located groove in the ring, which groove is set against the open ends of the hollow shafts in order that oil may be supplied thereto. Oil reaches the ring 84 through a hole 86 in the ring, which hole is in communication with a horizontal longitudinal bore 87 at one point in the upper wall of a housing section A''. Oil is supplied to the bore 87 from a fitting 88 set in the housing wall and in communication with a source (not shown) of lubricating oil under pressure. The fitting 88 gives ingress to the bore 87 and also to a vertical passage or bore 89 in a housing section A'''. The oil which is supplied to the hollow pinion shafts, as above described, serves to lubricate the pinions of the reverse gear set and adjacent parts owing to the fact that each shaft 79 and 80 is provided with port means leading laterally to the pinion bearing appurtenant to the shaft. As shown in Fig. 2, a port 90 in shaft 79 leads to the bearing of the short pinion, and another lateral port 91 leads to the surface of the shaft surrounded by the spacing sleeve 82. The shaft 80, on the other hand, has ports 92 leading to the antifriction bearing of the long pinion, as appears from Fig. 1. Lubricating oil forced into the hollow shafts therefore reaches the pinion bearings in a manner to lubricate them thoroughly. The external portions of the pinions are also lubricated thoroughly by reason of the fact that spray pipes or tubes 93, which are in communication with the groove in the oil-distributing ring 84, and are suitably fixed in position, extend between the groups of pinions in an arrangement such as shown in Fig. 5, each tube having a number of spray ports or openings 94 adapted to spray oil toward the center of the gear assembly in order to throw oil upon the gears that are in inner locations, which oil during the operation of the mechanism is transferred to the outer gears and then recovered in the sump.

It has been stated above that the fitting 88 gives ingress to the vertical bore 89, and this bore has communication with a space 95 between the shaft I and the supporting member or tube 27, which is rigid with the forward wall of the driving shell. The rear extremity of the tube 27 is continued past the rear end of the shaft I and is rotatably supported in a bore 96 in the housing section A'''. The bore 89 communicates with a space 97 that is disposed around the tube 27 forwardly of the section A''' and is defined in part by the rear edge of the shaft I, the arrangement being such that lubricant passing through the bore 89 is supplied to the open rear end of the shaft and is forced forwardly around the tube 27. Some of this oil passes through the bearing between the shaft and the tube 27 by one or more passages 33 and enters the space between the forward wall of the shell and the clutch element F and moves radially over the clutch element and is discharged through passages 98 (Fig. 2) at the periphery of the driving shell, the function of this oil being to lubricate the clutch element and adjacent parts. Lubricating oil in the longitudinal passage 95 can also pass radially through ports 99 in the shaft I into the space between the splined parts of shaft I and sleeve 23 so as to lubricate the axially movable clutch members and the pistons, and this oil can be discharged through ports 100 at the periphery of the shell adjacent the clutch member G. Lubricating oil can also pass from passage 95 through ports 101 in the shaft so as to enter a transverse groove 102 in the inner face of the sleeve 23, and thence be distributed in a radial direction through ports 103 in the sleeve to lubricate the bearing 24 and also the clutch element G.

Referring now to the provisions for delivering pressure fluid such as oil to the cylinders appurtenant to the friction clutches, it will be seen from Figs. 1, 3 and 4 that within the tube 27 is arranged a concentric tube of smaller diameter 104, the space between the two tubes being sufficient to carry pressure fluid for actuation of one of the pistons, i. e., the piston operating the forward clutch. As shown in Fig. 3, the forward open end of the tube 104 is received in a closely conforming cup 105 of suitable oil-resistant plastic material, said cup being extended over the mouth portion of the tube and the cup being closely received and held in the extension 30 at the forward end of the tube 27 and being abutted against the disk D, the arrangement being such that rotation of the driving shell causes rotation of tubes 27 and 104. In its lateral wall the cup 105 has a slot or notch 106 registering with a hole 106ª in the extension 30 so as to establish communication of the space between tubes 27, 104, and the supply passage 61 for the forward cylinder. At a point opposite the port 106 the wall of the tube 104 is provided with a hole 107 registering with a lateral hole 108 in the cup and with a hole 109 in the extension 30, the arrangement being such that the interior of the tube 104 is cut off from the passage 61 but is in communication with the passage 76 leading to the reverse drive clutch cylinder.

In the housing section A''' in which the rear end portion of the rotary tube 27 is received, there is a bearing for this tube, and there is an operative connection between the end of the tube and a rotary pump 110 which in a known manner sucks up oil from the sump in the housing and forces it to the selector valve M through a suitable conduit such as the pipe 111. The connection of the pump to the sump or other oil supply may be of any preferred kind, and is not shown in the drawings. The pump 110 is fixed to the rear face of the housing section A''' and the pump shaft 112 can be interlocked with the rotary tube 27 by a key 113, or in any other suitable manner to drive the pump shaft.

The tube 104 has its rear end held in fixed spaced relationship to the tube 27 by a plastic cup 114 similar to the cup 105, and adjacent the location of the cup 114 the housing is provided with upwardly directed passages or bores 115 and 116 that are parallel to each other and establish communication between the selector valve and the passage means leading to the respective cylinders. The passage 116 leads to the space between the tube 104 and the tube 27, and the passage 115 leads into the space within the tube 104. Around the bearing portion of the housing in which the rotary tube 27 is received are an annular supply recess 117 in communication with passage 116 and a similar supply recess 118 in communication with the other passage. Fluid passing downwardly through passage 116 enters the supply recess or groove 117 and passes thence through a port 119 into the space between the two tubes mentioned above, in a location forwardly of the cup 114. On the other hand, fluid passing downwardly through the passage 115 into the recess or groove 118 can reach the interior of the tube 104 through a port 120 in the wall of tube 27 and registering ports in cup 114 and tube 104.

It is believed that the operation of the mechanism will be apparent from the preceding description. In the position of Fig. 1, the clutch plate F is held in engagement with the forward wall or head of the driving shell so that the shaft I is rotated for forward drive. The lever 121 appurtenant to the valve M is in a position such that fluid passes from the valve through the course previously defined into the passages 61 and 62, having the effect of pressing the valve 65 radially inwardly so as to open the port 73 to incoming fluid and shut off the exhaust port 75, as shown in Fig. 7. At this time fluid is shut off from the valve 60 and the exhaust port of that valve is open so that any fluid in the other cylinder can flow out at the periphery of the driving shell and pass to the sump in the housing. It is understood that, by virtue of the connection between the two pistons provided by the ring 53 or equivalent member, it follows that, when the forward drive clutch plate is engaged by its piston with the drive shell, the rear clutch plate can free itself from the drive shell because of the removal of the rear piston from proximity to the rear plate.

Upon moving the handle 121 of the selector valve to the dotted-line position shown in Fig. 1, the forward cylinder is cut off from further supply of pressure fluid and the fluid can pass through the course above described into the rear cylinder, moving both pistons rearwardly and causing the rear clutch plate G to be clamped against the rear wall of the drive shell. Thus the forward end of the driven shaft I is disconnected from the head of the drive shell and said shaft driven in reverse direction through the sleeve member 23, as has been described above.

In Fig. 9 I have shown a modification in which the driving shell, instead of being rotated by a stub shaft, is rotated by connecting the drive shell to the flywheel of the prime mover. In this view the forward wall or head 122 of the shell has connected to it at the peripheral part a member 123 of flanged cross section having a peripheral wall extending forwardly. This wall is provided peripherally with splines engaging those on the inner circumference of a ring member 124, and the latter member is connected in a suitable manner, as by bolts 125, to a flywheel 126 on the shaft of the prime mover. This, however, is only one of many ways in which the connection of the driving shell to the power source can be effected. In the case shown in Fig. 9, the main housing 127 is connected by means such as bolts 128 to a housing member 129 which encloses the flywheel.

It is understood that in the structure above described a double cylinder for the pressure medium is provided by furnishing the axial outer wall of the drive shell with an inwardly projecting web or wall upon the inner boundary of which a duplex piston structure is mounted for sliding movement, the piston structure engaging the inner surfaces of two cylinders as well as the boundary of this inwardly projecting wall, the arrangement being such that the respective piston portions of the structure move in unison, as above described.

It is also understood that in the present reverse gear, as herein described, the fluid for actuating the two clutches passes to the cylinders by way of the radial partition wall, entering this wall at a point outwardly placed in a radial direction and moving in a radially inward direction to open the valve. The fluid pressure enters the forward head of the driving shell at or adjacent the center and moves radially outwardly to a passage in the peripheral part of the shell in which it moves axially and rearwardly toward the partition or web between the cylinders. These features provide a reverse gear having substantive advantages from the standpoint of organization of the parts, simplicity, compactness, and effective action. The construction is one in which the pressure fluid is directly supplied and distributed within the clutch housing and the movement of the clutch pistons and other parts kept under effective control. The reverse gear herein described also has provisions for lubricating the parts very effectively, as has been previously described. It will also be obvious that the arrangement and organization of the friction clutches with their hydraulic devices for effecting drive in opposite directions is a further contribution to the improvement of the mechanism.

No claim is made herein to the friction-clutch mechanism per se, as that subject matter is claimed in my divisional application, Serial No. 722,784, filed March 20, 1958.

While one form or reverse gear is herein described, together with a modified form of connection to the driving shell, it is to be understood that various modifications and changes in the details can be made without departing from the principles of the invention or the scope of the claims.

What I claim is:

1. In a reversing mechanism, a housing of elongated shape having provisions for mounting a horizontal drive shaft, a horizontal drive shaft mounted in said housing by said provisions, the forward end portion of said housing having a wall portion substantially concentric with said shaft, said end portion of the housing being provided with an upright wall at the end of the housing, the rear end portion of said housing being enlarged in a downward direction beneath the rear portion of said shaft, a downwardly offset output shaft journaled in said last-mentioned portion of the housing and carrying a reduction gear wheel meshing with a gear carried by the rear portion of said drive shaft, a rotary driving member in the forward end portion of the housing in the form of a drum or shell having a forward end wall, an axial wall and a rear wall, said member enclosing a portion of said driving shaft and being rotatable by a rotary driving element mounted in said upright housing wall, gearing including a gear fixed to said drive shaft forwardly of said gear connection with said offset shaft whereby the direction of rotation of said shaft can be reversed, driving means for said last-named gearing including a gear and a rotary carrying sleeve for said gear disposed around said drive shaft and extending into said driving shell at the rear end of the latter, friction-clutch means within said driving shell for clutching said sleeve to the rear wall of said shell, and friction-clutch means within said driving shell for clutching said driving shaft to the forward wall of said shell.

2. A reversing mechanism as defined in claim 1, in which the gearing for driving said driving shaft reversely and which includes a gear on the driving shaft and a gear on said rotary sleeve comprises a first set of pinions having fixed axes and meshing with the gear carried by the sleeve and a second set of pinions having fixed axes, each pinion of the second set being in mesh with one pinion of the first set and with the reversing gear on the drive shaft.

3. A reversing mechanism as defined in claim 1, in which the forward extremity of said driving shaft is located within the forward portion of said driving shell and is rotatably supported by a member projecting rearwardly from the forward wall of said shell.

4. In a reversing mechanism, a driving shaft, a housing in which said shaft is rotatably mounted, said housing having forward and rear ends by which the respective ends of said shaft are enclosed, a rotary driving drum or shell in the forward end of said housing having forward, axial and rear walls, means adjacent the forward end of said housing for rotating said shell, said shaft having an output gear connection adjacent the rear end thereof, the forward end of said shaft being located in the forward portion of said driving shell, a rotary sleeve disposed partly in the rear portion of said shell and partly to the rear of said shell, said sleeve carrying a gear at the rear of said shell, said sleeve being rotatable about said shaft, friction-clutch means in said shell for clutching the forward end of the shaft to the forward wall of said shell, friction-clutch means in said shell for clutching said sleeve to the rear wall of said shell, and gearing for reversing the rotation of said driving shaft connecting said sleeve gear with a gear carried by said shaft rearwardly of said sleeve and forwardly of the output gear connection of said driving shaft.

5. In a reversing mechanism, a driving shaft, a housing in which said shaft is rotatably mounted, said housing having forward and rear ends by which the respective ends of said shaft are enclosed, a rotary driving drum or shell in the forward end of said housing having forward, axial and rear walls, means adjacent the forward end of said housing for rotating said shell, the forward end of said shaft being located in the forward portion of said shell, a rotary sleeve disposed partly in the rear portion of said shell and partly to the rear of said shell, said sleeve carrying a gear at the rear of said shell, said sleeve being rotatable about said shaft, gearing for reversing the rotation of said driving shaft connecting said sleeve gear with a gear carried by said shaft rearwardly of said sleeve, fluid-operated friction-clutch means in said shell for clutching the forward end of the shaft to the forward wall of said shell, and fluid-operated friction-clutch means in said shell for clutching said sleeve to the rear wall of said shell, said shaft being a hollow shaft provided with interior fluid-supply connections to the respective friction-clutch means.

6. A reversing mechanism as defined in claim 5, in which the fluid-supply connections to the respective friction-clutch means include radial supply passages in the forward wall of the driving shell.

7. A reversing mechanism as defined in claim 5, in which the fluid-supply connections interiorly of the driving shaft include concentric tubes supported from the forward end of the driving shell.

8. In a reversing mechanism, a rotary driving shell having a forward wall and a rear wall, a hollow driven shaft having a forward end within the shell adjacent said forward wall and a rear end at some distance from said shell, a sleeve surrounding said shaft having a forward end within said shell adjacent said rear wall and a rear end forwardly of the rear end of said driven shaft, first and second friction-clutch members engaged respectively with the forward ends of said shaft and said sleeve, a hydraulically operable reciprocable duplex piston in said shell selectively operable to connect said first and second friction clutch members respectively with said forward wall of said shell and said rear wall of said shell, an output shaft below and parallel to the rear portion of said driven shaft geared to said rear portion by reduction gearing, gear means operable from the rear portion of said sleeve for imparting reverse rotation to said output shaft, and means disposed in part within said hollow driven shaft and receiving pressure fluid at the rear end portion of said shaft and having passages extending substantially throughout the length of said shaft for applying pressure fluid to the respective parts of said duplex piston.

9. In a reversing mechanism, a rotary driving shell having an axial wall, a forward wall and a rear wall, a driven hollow shaft having a forward end within the shell adjacent said forward wall and a rear end at some distance from said shell, a sleeve surrounding said shaft having a forward end within said shell adjacent said rear wall and a rear end spaced from said shell, first and second friction-clutch members connected respectively with the forward ends of said shaft and said sleeve, a reciprocable piston in said shell which is of U-shaped cross section with the open part of the U outwardly disposed and the sides of the U in proximity to said first and second friction-clutch members, an inwardly directed partition member on the axial wall of the shell extending into said piston and provided with fluid passages selectively usable to move one or the other of said friction-clutch members into engaged position by movement of said piston, an output shaft geared to said driven shaft, gear means operable from the rearwardly extended portion of said sleeve for imparting reverse rotation to said output shaft, and means for supplying pressure fluid from the rear of the reversing mechanism to said fluid passages of said partition member, said means presenting passages extending through said hollow shaft from the rear end thereof and other passages located in said forward wall of said shell.

References Cited in the file of this patent

UNITED STATES PATENTS

| | | |
|---|---|---|
| 1,431,100 | De Martino | Oct. 3, 1922 |
| 1,768,859 | Petrelli | July 1, 1930 |
| 2,234,693 | Frink | Mar. 11, 1941 |
| 2,304,030 | Schmitter | Dec. 1, 1942 |
| 2,335,926 | Fawick | Dec. 7, 1943 |
| 2,386,367 | Taylor | Oct. 9, 1945 |
| 2,505,450 | Wemp | Apr. 25, 1950 |
| 2,535,924 | Hobbs | Dec. 26, 1950 |
| 2,586,220 | Gerst | Feb. 19, 1952 |
| 2,719,621 | Clough | Oct. 4, 1955 |